United States Patent [19]
Uraki et al.

[11] Patent Number: 6,031,024
[45] Date of Patent: Feb. 29, 2000

[54] INKJET RECORDING LIQUID AND PROCESS FOR THE PRODUCTION THEREOF

[75] Inventors: Hisashi Uraki; Seiji Sawada; Yasuharu Iida; Sunao Satake; Tsutomu Fujigamori; Seiji Aida, all of Tokyo, Japan

[73] Assignee: Toyo Ink Manufacturing Co., Ltd., Tokyo, Japan

[21] Appl. No.: 09/028,325

[22] Filed: Feb. 24, 1998

[51] Int. Cl.⁷ .............................. C09D 5/00; C09D 11/00; C08K 9/00; C08K 9/02; C08K 9/10

[52] U.S. Cl. .................. 523/161; 106/31.13; 106/31.65; 523/160; 523/200; 523/204; 523/207; 523/210; 523/220; 523/222

[58] Field of Search ...................................... 523/204, 207, 523/220, 222, 160, 161, 200, 210; 106/31.13, 31.65

[56] References Cited

U.S. PATENT DOCUMENTS 5,716,435  2/1998  Aida et al. ........................... 106/31.85

*Primary Examiner*—Patrick D. Niland
*Attorney, Agent, or Firm*—Wenderoth, Lind & Ponack, L.L.P.

[57] ABSTRACT

An inkjet recording ink having excellent water resistance and having excellent ejection stability through a nozzle, which ink is obtained by dispersing colorant particles in a water-based liquid, the colorant particles being a product formed by coating each of resin particles having an average particle diameter of 50 to 300 nm with an organic pigment.

15 Claims, 5 Drawing Sheets

2.0 μm 1.0 μm 0.8 μm 1.0 μm 0.5 μm

«6,031,024»

INKJET RECORDING LIQUID AND PROCESS FOR THE PRODUCTION THEREOF

FIELD OF THE INVENTION

The present invention relates to an inkjet recording liquid having excellent water resistance and a process for the production thereof. More specifically, it relates to an inkjet recording liquid which contains water as a medium but is excellent in water resistance and ejection stability in a nozzle, and a process for the production thereof.

PRIOR ART

As an inkjet recording liquid, there have been and is used a solution prepared by dissolving a water-soluble dye such as an acidic dye, a substantive dye or a basic dye in a mixture of a glycol-containing solvent with water, as is disclosed in JP-A-53-61412, JP-A-54-89811 and JP-A-55-65269. Since, however, the water-soluble dye is generally selected from dyes having high solubility in water for achieving the stability of the recording liquid, there are the following problems. An inkjet recorded product is generally poor in water resistance, and when water is spilled thereon, a dye constituting a recorded portion easily bleeds.

For overcoming the above poor water resistance, attempts have been made to change the dye in structure or prepare a recording liquid having high basicity, as is disclosed in JP-A-56-S7862. Further, attempts have been also made to utilize a reaction between a recording sheet and a recording liquid to improve a recorded product in water resistance, as is disclosed in JP-A-50-49004, JP-A-57-36692, JP-A-59-20696 and JP-A-59-146889.

The above attempts are remarkably effective when certain kinds of recording sheets are used. However, the above methods are limited in use so long as the recording sheets that can be used are limited in kind. Further, when a recording sheet other than the specific kinds of sheets is used, it is difficult to obtain a recorded product having sufficient water resistance in many cases.

There are recording liquids having good water resistance, which are obtained by dispersing or dissolving an oil-soluble dye in a solvent having a high boiling point or by dissolving an oil-soluble dye in a volatile solvent. However, these recording liquids are environmentally unacceptable in some cases due to the odor and discharge of the solvent, and the requirement to recover the solvent may be a problem when a large volume of recording is conducted or when a recording apparatus is placed in some place.

It is therefore strongly desired to develop a recording liquid which is prepared by dispersing a pigment in a water-based medium and gives a recording product improved in water resistance.

SUMMARY OF THE INVENTION

It is an object of the present invention to provide an inkjet recording ink which has excellent water resistance and has excellent ejection stability through a nozzle, and a process for the production thereof.

According to the present invention, there is provided an inkjet recording liquid obtained by dispersing colorant particles in a water-based liquid, the colorant particles being a product formed by coating each of resin particles having an average particle diameter of 50 to 300 nm with an organic pigment.

According to the present invention, further, there is provided an inkjet recording liquid obtained by dispersing the above colorant particles and the organic pigment in a water-based liquid.

According to the present invention, further, there is provided a process for the production of the above inkjet recording liquid, which comprises mixing and dispersing a water-based dispersion of an organic pigment and a water-based dispersion of resin particles having an average particle diameter of 50 to 300 nm.

According to the present invention, further, there is provided a process for the production of the above inkjet recording liquid, which comprises dispersing an organic pigment and a dispersing agent in a water-based liquid to form a water-based dispersion, and mixing and dispersing the water-based dispersion and a dispersion of resin particles having an average particle diameter of 50 to 300 nm.

According to the present invention, further, there is provided a process for the production of the above inkjet recording liquid, which comprises kneading an organic pigment together with a water-soluble inorganic salt and a water-soluble solvent, dispersing the resultant kneaded mixture in water, removing the water-soluble inorganic salt and the water-soluble solvent to obtain a dispersion, and mixing and dispersing the obtained dispersion and a dispersion of resin particles having average particle diameter of 50 to 300 nm.

According to the present invention, further, there is provided a process for the production of the above inkjet recording liquid, which comprises dispersing an organic pigment, a dispersing agent and a compound of the formula (1) in a water-based liquid to form a water-based dispersion, and mixing and dispersing the water-based dispersion and a dispersion of resin particles having an average particle diameter of 50 to 300 nm, $$P\text{—}[X\text{—}Y\text{—}Z\text{—}N(R^1)R^2]_n \qquad (1)$$

wherein P is an organic dyestuff residue, a heterocyclic ring residue or an aromatic polycyclic compound residue, X is a divalent binding group composed of a chemically rational combination of 2 to 15 atoms selected from S, C, N, 0 and H, Y is a direct bond or a divalent binding group selected from —NR— (in which R is H or an alkyl group having 1 to 18 carbon atoms) or —O—, Z is an alkylene group having 1 to 6 carbon atoms, each of $R^1$ and $R^2$ is independently an alkyl group having 1 to 18 carbon atoms which alkyl group may have a substituent, provided that $R^1$ and $R^2$ may together form a heterocyclic ring which may have a substituent, and n is an integer of 1 to 3.

According to the present invention, further, there is provided a process for the production of the above inkjet recording liquid, which comprises kneading an organic pigment together with a water-soluble inorganic salt, a water-soluble solvent and a compound of the above formula (1), dispersing the resultant kneaded mixture in water, removing the water-soluble inorganic salt and the water-soluble solvent to obtain a dispersion, and mixing and dispersing the obtained dispersion and a dispersion of resin particles having average particle diameter of 50 to 300 nm.

DETAILED DESCRIPTION OF THE INVENTION

Figure 1:
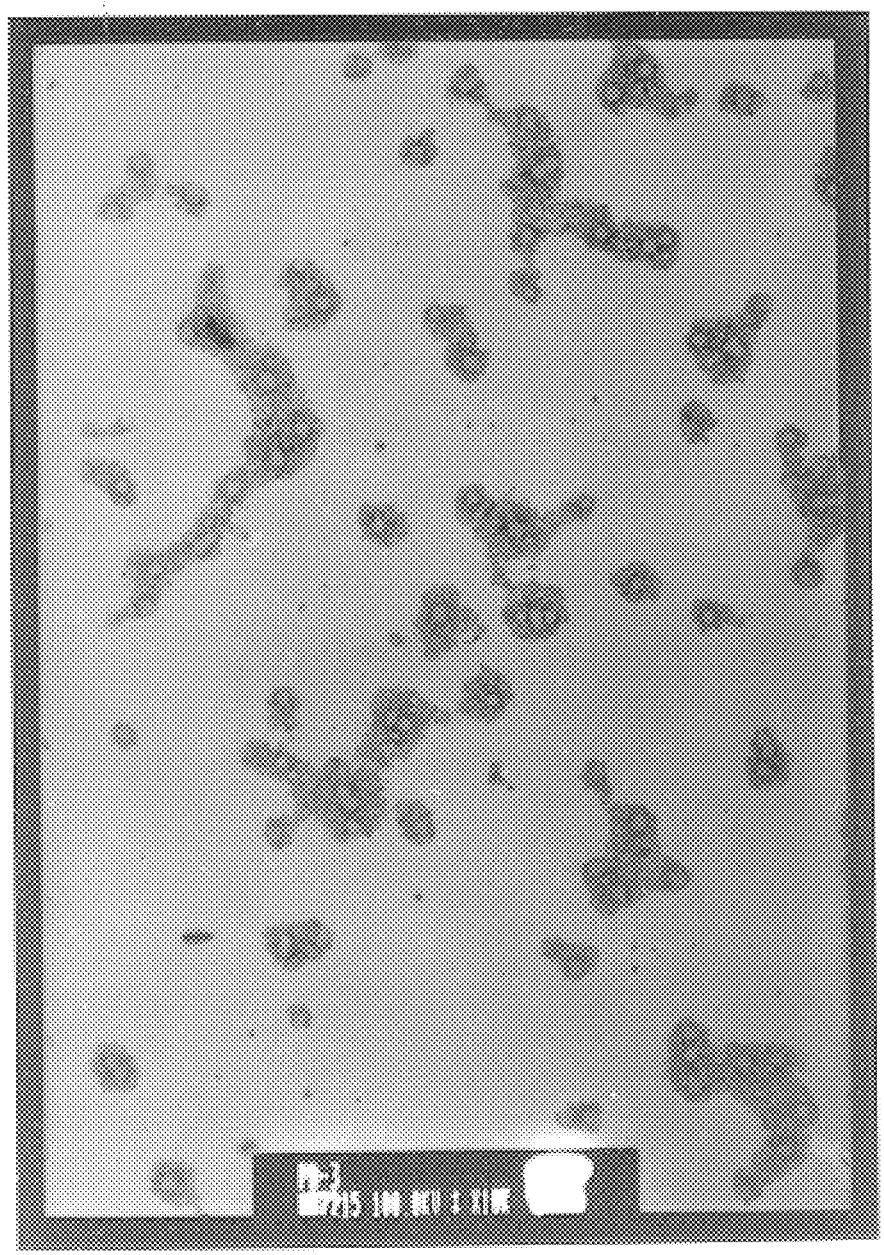
FIG. 1 shows an electron microscopic photograph of a recording liquid obtained in Example 1.

The colorant particles used in the present invention have a form as shown in FIGS. 1 to 5, in which each resin particle as a core is coated with particles of an organic pigment as a shell.

The mixing ratio (solid content weight ratio) of the resin particles and the organic pigment which constitute the colorant particles is preferably 1:6 to 6:1.

The inkjet recording liquid of the present invention may further contain an free organic pigment in addition to the colorant particles. The mixing ratio (solid content weight ratio) of the colorant particles and the free organic pigment is preferably 1:10 to 10:1.

Further, the inkjet recording liquid of the present invention preferably contains 0.1 to 10% by weight, as a solid content, of the colorant particles obtained by coating each resin particle with the organic pigment.

The inkjet recording liquid of the present invention preferably contains 0.1 to 11% by weight, as a solid content, of the colorant particles and the free organic pigment.

The resin particles for constituting the colorant particles have an average particle diameter of 50 to 300 nm, preferably 50 to 200 nm. The resin particles are obtained by the emulsion-polymerization of a monomer A such as alkyl ester, aryl ester or aryl alkyl ester of an unsaturated carboxylic acid such as acrylic acid, methacrylic acid, itaconic acid or maleic acid, styrene, α-methylstyrene or vinyl toluene and at least one of the following monomers B according to a general method. Examples of the monomers B includes monomers having a carboxyl group, a sulfonic acid group, a sulfuric acid ester group or a phosphate ester group, monomers such as sodium salts, potassium salts, lower amine salts (alkylamines, alkanolamines, primary amines, secondary amines and tertiary amines) of these, monomers having a cationic hydrophilic group such as ammonium group or pyridium group, and monomers having a nonionic hydrophilic group such as a hydroxyl group, carboamide group, polyether glycol group or ether group.

The inkjet recording liquid of the present invention may contain a neutralizing agent such as ammonia, an amine or an inorganic alkali as required. The neutralizing agent is properly adjusted before use.

The organic pigment for constituting the colorant particles and the free organic pigment are selected from a quinacridone-based organic pigment, a phthalocyanine-based organic pigment, an azo-based organic pigment, an isoindolinone-based organic pigment or an imidazolone-based organic pigment. These organic pigments may be used alone or in combination.

The organic pigment for constituting the colorant particles preferably has a smaller average particle diameter than the resin particles. The average particle diameter of the primary particles of the organic pigment, measured through a transmission electron microscope, is preferably 10 to 70 µm, more preferably 10 to 40 nm. The average particle diameter of the free organic pigment is also preferably in the above range.

Specific examples of the organic pigment for constituting the colorant particles and the free organic pigment include insoluble azo pigments such as as Toluidine Red, Toluidine Maroon, Hansa Yellow, Benzidine Yellow and Pyrazolone Red; soluble azo pigments such as Lithol Red, Helio Bordeaux, Pigment Scarlet and Permanent Red 2B; derivatives of vat dyes such as alizarine, indanthrone and Thioindigo Maroon, phthalocyanine pigments such as Phthalocyanine Blue and Phthalocyanine Green, quinacridone pigments such as Quinacridone Red and Quinacridone Magenta; perylene pigments such as Perylene Red and Perylene Scarlet; isoindolinone pigments such as Isoindolinone Yellow and Isoindolinone Orange; imidazolone pigments such as Benzimidazolone Yellow, Benzimidazolone Orange and Benzimidazolone Red, pyranthrone pigments such as Pyranthrone Red and Pyranthrone Orange; thioindigo pigments; fused azo pigments; and other pigments such as Flavanthrone Yellow, Acylamide Yellow, Quinophthalone Yellow, Nickel Azo Yellow, Copper Azomethine Yellow, Perinone Orange, Anthrone Orange, Dianthraquinonyl Red and Dioxazine Violet.

Color index (C.I.) numbers of the above organic pigments are as follows: C. I. Pigment Yellow 12, 13, 14, 17, 20, 24, 74, 83, 86, 93, 109, 110, 117, 120, 125, 137, 138, 147, 148, 151, 153, 154, 166 and 168, C. I. Pigment Orange 16, 36, 43, 51, 55, 59 and 61, C. I. Pigment Red 9, 48, 49, 52, 53, 57, 97, 122, 123, 149, 168, 175, 176, 177, 180, 192, 215, 216, 217, 220 223, 224, 226, 227, 228, 238 and 240, C. I. Pigment Violet 19, 23, 29, 30, 37, 40 and 50, C. I. Pigment Blue 15, 15:1, 15:4, 15:6, 22, 60 and 64, C. I. Pigment Green 7 and 36, and C. I. Pigment Brown 23, 25 and 26.

The colorant particles used in the present invention are prepared by mixing and dispersing a dispersion of the organic pigment in a water-based liquid and a dispersion of the resin particles having an average particle diameter of 50 to 300 nm.

The organic pigment can be dispersed in the water-based liquid by means of a general dispersing machine such as a sand mill, a ball mill, attritor or a paint shaker. The organic pigment can be also dispersed by the following method. The organic pigment is dispersed in the water-based liquid together with a dispersing agent in advance, and the resultant dispersion is allowed to pass a flow path having at least two corner portions under a liquid pressure of 100 to 1,000 $kg/cm^2$, or the organic pigment is dispersed in the water-based liquid and the resultant dispersion and a dispersing agent are allowed to pass a flow path having at least two corner portions under a liquid pressure of 100 to 1,000 $kg/cm^2$. In the flow path, the dispersion of the organic pigment in the water-based liquid collides with a wall of the corner portions, the dispersion and the inner wall of the flow path cause friction, and a sharp pressure change occurs. Owing to these effects, the organic pigment is dispersed in the water-based liquid.

As an apparatus having a flow path having at least two corner portions to give a dispersion by means of collision of a dispersion against walls of the corner portions in the flow path, friction between the dispersion and the inner wall of the flow path and a sharp pressure change, a "microfluidizer" supplied by Seiko EG & G is available.

The above-obtained dispersion of the organic pigment and a dispersion of the resin particles having an average particle diameter of 50 to 300 nm are mixed and stirred optionally together with water, a water-based solvent and a dispersing agent, whereby there is obtained an inkjet recording liquid in which colorant particles formed by coating each resin particle with the organic pigment is dispersed in the water-based liquid as shown in FIGS. 1 to 5. The inkjet recording liquid may contain a free organic pigment.

The above mixing and dispersing can be carried out with a general stirrer having blade(s), and a mixing stirrer such as a high-speed stirrer or an emulsifier may be also used.

The above dispersing agent can be selected from various surfactants, dispersing agents having low molecular weights, or resin-based dispersing agents having hydrophilic functional groups and hydrophobic functional groups.

Further, a compound of the following formula (1) may be used in combination with the dispersing agent,

P—[X—Y—Z—N($R^1$)$R^2$]$_n$ (1)

wherein P is an organic dyestuff residue, a heterocyclic ring residue or an aromatic polycyclic compound residue, X is a divalent binding group composed of a chemically rational combination of 2 to 15 atoms selected from S, C, N, O and H, Y is a direct bond or a divalent binding group selected from —NR— (in which R is H or an alkyl group having 1 to 18 carbon atoms) or —O—, Z is an alkylene group having 1 to 6 carbon atoms, each of $R^1$ and $R^2$ is independently an alkyl group having 1 to 18 carbon atoms which alkyl group may have a substituent, provided that $R^1$ and $R^2$ may together form a heterocyclic ring which may have a substituent, and n is an integer of 1 to 3.

The above surfactant include anionic, nonionic, cationic and amphoteric surfactants.

Examples of the anionic surfactants include fatty acid salt, alkyl sulfate, alkylaryl sulfonate, alkylnaphthalene sulfonate, dialkyl sulfonate, dialkyl sulphosuccinate, alkyl diaryl ether disulfonate, alkyl phosphate, polyoxyethylene alkyl ether sulfate, polyoxyethylene alkylaryl ether sulfate, naphthalene sulfonate-formalin condensate, polyoxyethylene alkyl phosphate, glycerol borate fatty acid ester and polyoxyethylene glycerol fatty acid ester.

Examples of the nonionic surfactants include polyoxyethylene alkyl ether, polyoxyethylene alkylaryl ether, polyoxyethylene oxypropylene block copolymer, sorbitan fatty acid ester, polyoxyethylene sorbitan fatty acid ester, polyoxyethylene sorbitol fatty acid ester, glycerin fatty acid ester, polyoxyethylene fatty acid ester polyoxyethylene alkylamine, a fluorine-containing nonionic surfactant and a silicon-containing nonionic surfactant.

Examples of the cationic surfactants include alkylamine salt, ammonium salt, alkylpyridinium salt and alkylimidazolium salt.

Examples of the amphoteric surfactants include alkylbetaine, alkylamine oxide and phosphatidylcholine.

For finely milling the organic pigment which is to compose the colorant particles or the free organic pigment, preferably, the organic pigment is kneaded together with a water-soluble inorganic salt, a water-soluble solvent and optionally a compound of the following formula (1), the kneaded mixture is dispersed in water, and the water-soluble inorganic salt and the water-soluble solvent are removed, to obtain a dispersion of the organic pigment. In this method, primary particles of the organic pigment are mechanically pulverized with using the water-soluble inorganic salt as a pulverizing aid. Specifically, a small amount of a water-soluble solvent as a wetting agent is added to a mixture of the organic pigment, a water-soluble inorganic salt and optionally a compound of the formula (1), and the mixture is kneaded with a kneader, etc., poured into water and stirred with a high-speed mixer, etc., to form a slurry. Then, the slurry is filtered and washed with water repeatedly to remove the water-soluble inorganic salt and the water-soluble solvent.

P—[X—Y—Z—N($R^1$)$R^2$]$_n$ (1)

wherein P is an organic dyestuff residue, a heterocyclic ring residue or an aromatic polycyclic compound residue, X is a divalent binding group composed of a chemically rational combination of 2 to 15 atoms selected from S, C, N, 0 and H, Y is a direct bond or a divalent binding group selected from —NR— (in which R is H or an alkyl group having 1 to 18 carbon atoms) or —O—, Z is an alkylene group having 1 to 6 carbon atoms, each of $R^1$ and $R^2$ is independently an alkyl group having 1 to 18 carbon atoms which alkyl group may have a substituent, provided that $R^1$ and $R^2$ may together form a heterocyclic ring which may have a substituent, and n is an integer of 1 to 3.

Specifically, X includes —$SO_2$—, —CO—, —$CH_2$—, —$CH_2S$—, —$CH_2O$—, —COO—, —NH—, —$CH_2NHCOCH$— or a combination of at least two groups of these. Of these, —$SO_2$—, —CO— and —$CH_2$— are preferred. Elements other than carbon, which are to compose the above heterocyclic ring formed of $R^1$ and $R^2$ include N, O and S.

Specific examples of the compound of the above formula P—[X—Y—Z—N($R^1$)$R^2$]$_n$ are as follows.

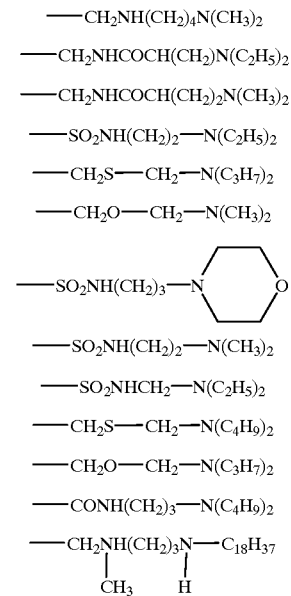

In general, the organic pigment and P in the compound of the above formula (1), i.e., an organic dyestuff residue, a heterocyclic ring residue or an aromatic polycyclic compound residue, are selected from the same types in view of a hue. For example, when the organic pigment is a blue phthalocyanine-based pigment, P is preferably a phthalocyanine-based residue. When the organic pigment is a red quinacridone-based pigment, P is preferably a quinacridone-based residue. When the organic pigment is a yellow benzimidazole-based pigment, P is preferably a benzimidazole-based residue. However, the organic pigment and P are not necessarily of the same types.

The compound of the above formula (1) is preferably partially soluble in the water-soluble solvent which is used as a wetting agent. When the compound of the formula (1) is not soluble, preferably, the compound of the formula (1) is solubilized by a neutralization treatment, etc., in which a dilute acid is added to the compound of the formula (1). The acid is selected from acetic acid, hydrochloric acid or sulfuric acid.

Further, when the organic pigment is kneaded together with the water-soluble inorganic salt, the water-soluble solvent and optionally the compound of the formula (1), additives such as a dispersing agent and a plasticizer may be used in combination. Further, at least two compounds of the above formula (1) may be used, and at least two organic pigments may be mixed and finely dispersed.

The water-soluble inorganic salt includes sodium chloride and potassium chloride.

The water-soluble solvent is not specially limited, while a water-soluble solvent having a high boiling point is preferred in view of safety, since the solvent is brought into an easily volatilizable state when a kneading temperature increases.

Examples of the water-soluble solvent include 2-(methoxymethoxy)ethanol, 2-butoxyethanol, 2-(isopentyloxy)ethanol, 2-(hexyloxy)ethanol, diethylene glycol, diethylene glycol monomethyl ether, diethylene glycol monoethyl ether, diethylene glycol monobutyl ether, triethylene glycol, triethylene glycol monomethyl ether, liquid polyethylene glycol, 1-methoxy-2-propanol, 1-ethoxy-2-propanol, dipropylene glycol, dipropylene glycol monomethyl ether, dipropylene glycol monoethyl ether, and polypropylene glycol having a low molecular weight.

The inkjet recording liquid can be produced by fully dispersing a dispersion of the organic pigment optionally together with a water-soluble resin, water and a dispersing agent with a dispersing machine such as a sand mill, a homogenizer, a ball mill, a paint shaker or an ultrasonic dispersing machine, to prepare a dispersion in a concentrated state in advance, then mixing the prepared dispersion with a dispersion of the resin particles having an average particle diameter of 50 to 300 nm and optionally water and an additive and stirring the resultant mixture.

Desirably, the inkjet recording liquid is obtained by filtering the above-obtained dispersion through a filter of which the openings have a diameter of 1 μm or less, preferably 0.8 μm or less, more preferably 0.45 μm or less.

Before the above filtering, particles having a large size can be removed by centrifugal separation. In this case, the clogging of the filter can be decreased, and the filter can have a longer service life.

The above water-soluble resin is used for strongly fixing the colorant particles. The water-soluble resin includes water-soluble acrylic, styrene-acrylic, polyester, polyamide and polyurethane resins.

The amount of the water-soluble resin based on the recording liquid is preferably 5% by weight or less. When the above amount exceeds 5% by weight, the ejection stability of the recording liquid may decrease in some cases.

The inkjet recording liquid of the present invention contains, as a medium, a water-based liquid containing water and optionally a water-soluble solvent. The water is selected from deionized water from which metal ion, etc., are removed or distilled water.

The water-soluble solvent is used for preventing the drying of the recording liquid in a nozzle portion and the solidification of the recording liquid, stabilizing the ejection of the recording liquid and preventing the drying of a nozzle which occurs with time. The amount of the water-soluble solvent based on the recording liquid is 0 to 50% by weight.

Examples of the water-soluble solvent include ethylene glycol, diethylene glycol, propylene glycol, triethylene glycol, polyethylene glycol, glycerin, tetraethylene glycol, dipropylene glycol, ketone alcohol, diethylene glycol monobutyl ether, ethylene glycol monobutyl ether, ethylene glycol monoethyl ether, 1,2-hexanediol, N-methyl-2-pyrrolidone, substituted pyrrolidone, 2,4,6-hexanetriol, tetrafurfuryl alcohol and 4-methoxy-4-methylpentanone. The above water-soluble solvents may be used alone or in combination.

Further, an alcohol such as methanol, ethanol or isopropyl alcohol may be used for increasing the drying rate of the ink on a recording sheet such as paper.

When the recording sheet is formed of a permeable material such as paper, a penetrant may be added for increasing the penetration of the ink into the recording sheet and increasing the apparent drying rate on the recording sheet.

The above penetrant includes glycol ethers such as diethylene glycol monobutyl ether, etc., included in the above water-soluble solvent, alkylene glycol, polyethylene glycol monolauryl ether, sodium laurylsulfate, sodium dodecylbenzenesulfonate, sodium oleate and sodium dioctylsulfosuccinate. The penetrant exhibits a sufficient effect when used in an amount of 5% by weight or less based on the recording liquid. When the amount of the penetrant exceeds 5% by weight, undesirably, a printing may bleed or "print-through" may take place.

The inkjet recording liquid of the present invention may contain 0.05 to 1.0% by weight, based on the recording liquid, of a biocide for preventing the occurrence of mildew. The biocide is selected from sodium dehydroacetate, sodium benzoate, sodium pyridinethione-1-oxide, zinc pyridinethione-1-oxide, 1,2-benzisothiazolin-3-one or amine salts of 1,2-benzisothiazolin-3-one.

The inkjet recording liquid of the present invention may contain 0 to 0.5% by weight, based on the recording liquid, of a chelating agent for preventing the precipitation of a metal in a nozzle portion and the precipitation of an insoluble in the recording liquid. The chelating agent works to block a metal ion in the recording liquid. Specifically, the chelating agent is selected from ethylenediamine tetraacetic acid, sodium salt of ethylenediamine tetraacetic acid, diammonium salt of ethylenediamine tetraacetic acid or tetrammonium salt of ethylenediamine tetraacetic acid.

A pH adjuster such as an amine, an inorganic salt or ammonia and a buffer solution such as phosphoric acid may be used for adjusting the pH of the recording liquid, stabilizing the recording liquid and stabilizing an ink-tubing in a recording device.

Further, the inkjet recording liquid of the present invention may contain an anti-foaming agent for preventing the occurrence of foams when the recording liquid is circulated, moved or produced.

For adjusting a hue and providing a concentration, further, the inkjet recording liquid of the present invention may contain a dye in a form which does not cause any problem on water resistance and light fastness. The use of a dye may cause an adverse effect on the dispersion stability of the pigment in some cases. The amount of the dye based on the pigment is therefore preferably 40% by weight or less, more preferably 25% by weight or less. The dye is selected from water-insoluble dyes such as a disperse dye and an oil-soluble dye, insolubilized dyes prepared by insolubilizing an a substantive dye, acidic dye, a basic dye, etc., by chelating, a reactive dye or a metal-containing dye. A purified dye from which an inorganic salt is removed is preferred as a dye.

The inkjet recording liquid of the present invention may contain other additives such as urea and dimethyl urea.

The inkjet recording liquid of the present invention is preferably prepared as a liquid having viscosity of 0.8 to 15 cps (25° C.), although the viscosity differs depending upon the method of a recording device. The inkjet recording liquid preferably has a surface tension of 25 to 60 dyn/cm. Although not specially limited, the pH of the inkjet recording liquid is 4 to 12, and the inkjet recording liquid is preferably neutral or weakly acidic in the pH range of 7 to 12.

EXAMPLES

The present invention will be explained with reference to Examples hereinafter. In Examples, "part" stands for "part by weight", and "%" stands for "% by weight".

Example 1

A 1-gallon kneader made of stainless steel (supplied by Inoue Mfg. Co.) was charged with 220 parts of a quinacridone red pigment (Hostarperm Pink E, supplied by Hoechst Industry Ltd.), 2,200 parts of sodium chloride and 160 parts of polyethylene glycol (Polyethylene Glycol 300, supplied by Tokyo Kasei Kogyo Co., Ltd.), and these components were kneaded for 6 hours. The resultant mixture was poured into 2.5 l of warm water and stirred with a high-speed mixer under heat at about 80° C. for about 1 hour to form a slurry. The slurry was repeatedly filtered and washed with water 8 times to remove the sodium chloride and the polyethylene glycol, and a water-based red pigment slurry I having a solid content of 50% was obtained.

The following materials were placed in a sand mill and dispersed for 2 hours to prepare a concentrated inkjet recording liquid.

Water-based red pigment slurry I(solid content 50%) 50.0 parts

Acrylic resin aqueous solution 3.0 parts ("Joncryl 62", solid content 31.0%, supplied by Johnson Polymer Corp.)

Dimethylaminoethanol 0.1 parts

Nonionic surfactant (Emulgen A-90, supplied by Kao Corp.) 1.0 part

Purified water 50.0 parts

Glycerin 6.0 parts

Figure 2:
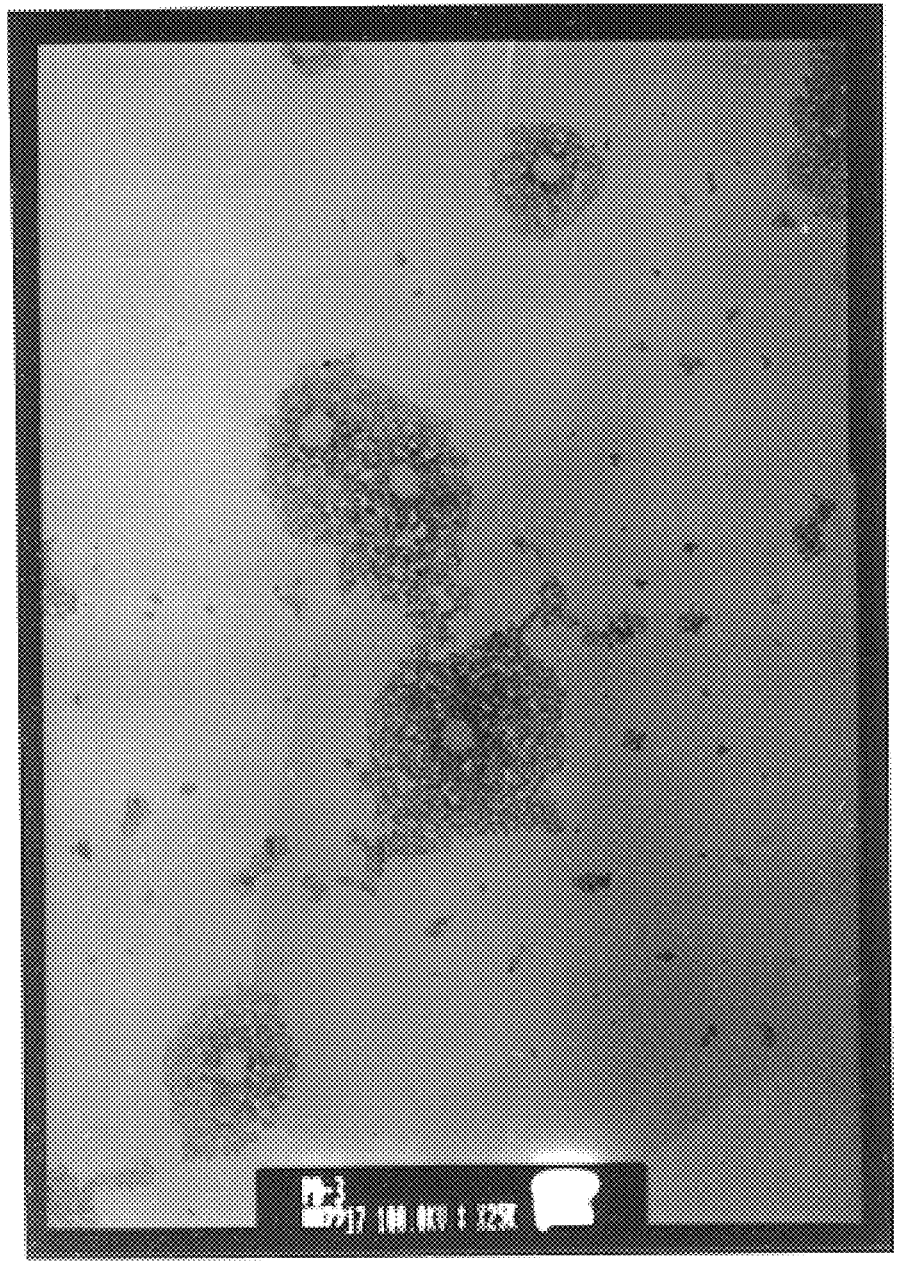
FIG. 2 shows an electron microscopic photograph of a recording liquid obtained in Example 1.

The following materials were mixed. Then, the mixture was filtered through a membrane filter having openings having a diameter of 1 µm, and further filtered through a membrane filter having openings having a diameter of 0.45 µm, to obtain a recording liquid. The obtained recording liquid was observed through a transmission electron microscope to show a dispersion state as shown in FIGS. 1 and 2.

The above concentrated inkjet recording liquid 13.5 parts

Nonionic surfactant (Emulgen A-90, supplied by Kao Corp.) 0.2 part

Acrylic resin emulsion 2.5 parts ("W-251", solid content 40%, supplied by Nippon Polymer Industry Co., Ltd.)

Ethylene glycol 10.0 parts

Biocide (Sodium Omadine, supplied by Olin Chemical Corp.) 0.15 part

Ethylenediamine tetracetic acid sodium salt 0.02 part

Purified water 63.53 parts

Example 2

A 1-gallon kneader made of stainless steel (supplied by Inoue Mfg. Co.) was charged with 250 parts of crude copper phthalocyanine (copper phthalocyanine supplied by Toyo Ink Manufacturing Co., Ltd.), 2,500 parts of sodium chloride, 25 parts of a blue pigment dispersing agent (P—[CH$_2$NH(CH$_2$)$_4$N(CH$_3$)$_2$]$_3$, P=copper phthalocyanine residue) and 160 parts of polyethylene glycol ("Polyethylene Glycol 300", supplied by Tokyo Kasei Kogyo Co., Ltd.), and these components were kneaded for 3 hours. Then, the resultant mixture was poured into 2.5 l of warm water and stirred with a high-speed mixer under heat at about 80° C. for about 1 hour to form a slurry. The slurry was repeatedly filtered and washed with water five times to remove the sodium chloride and the polyethylene glycol, and a water-based blue pigment slurry II having a solid content of 50% was obtained.

The following materials were placed in a sand mill and dispersed for 3 hours to prepare a concentrated inkjet recording liquid.

Water-based blue pigment slurry II (solid content 50%) 30.0 parts

Acrylic resin aqueous solution 3.0 parts ("Joncryl 61J", solid content 31.0%, supplied by Johnson Polymer Corp.)

Nonionic surfactant (Emulgen 420, supplied by Kao Corp.) 1.0 part

Purified water 50.0 parts

Glycerin 6.0 parts

The following materials were mixed. Then, the mixture was filtered through a membrane filter having openings having a diameter of 1 µm, and further filtered through a membrane filter having openings having a diameter of 0.45 µm, to obtain a recording liquid.

The above concentrated inkjet recording liquid 13.5 parts

Nonionic surfactant (Emulgen 420, supplied by Kao Corp.) 0.2 part

Acrylic resin emulsion 2.2 parts ("W-251", solid content 40%, supplied by Nippon Polymer Industry Co., Ltd.)

Ethylene glycol 10.0 parts

Biocide (Sodium Omadine, supplied by Olin Chemical Corp.) 0.15 part

Ethylenediamine tetracetic acid sodium salt 0.02 part

Purified water 63.53 parts

Example 3

An inkjet recording liquid was obtained in the same manner as in Example 2 except that 250 parts of the crude copper phthalocyanine was replaced with 260 parts of a benzimidazolone yellow pigment (Hostarperm Yellow H3G, supplied by Hoechst Industry Ltd.) and that 25 parts of the blue pigment dispersing agent was replaced with 15 parts of a yellow pigment dispersing agent (P—[CH$_2$NH(CH$_2$)$_4$N(CH$_3$)$_2$]$_3$, P=benzimidazole residue).

Example 4

The same kneader as that used in Example 1 was charged with 250 parts of crude copper phthalocyanine (copper phthalocyanine supplied by Toyo Ink Manufacturing Co., Ltd.), 900 parts of sodium chloride, 25 parts of a blue pigment dispersing agent (P—[CH$_2$NH(CH$_2$)$_4$N(CH$_3$)$_2$]$_3$ P=copper phthalocyanine residue), 100 parts of an acrylic oligomer ("Joncryl 682" supplied by Johnson Polymer Corp.) and 160 parts of diethylene glycol (supplied by Tokyo Kasei Kogyo Co., Ltd.), and these components were kneaded for 2 hours. Then, the resultant mixture was treated in the same manner as in Example 1 to give a water-based blue pigment slurry IV having a solid content of 50%.

The following materials were placed in a sand mill and dispersed for 4 hours to prepare a concentrated inkjet recording liquid.

Water-based blue pigment slurry IV (solid content 50%) 30.0 parts

Acrylic resin emulsion 2.3 parts
("F-157", solid content 40%, supplied by Nippon Polymer Industry Co., Ltd.)
Dispersing agent ("Solsperse 27000" supplied by Zeneca K.K.) 0.5 part
Purified water 74.0 parts
Glycerin 5.8 parts
Dimethylethanolamine 0.1 part The following materials were mixed. Then, the mixture was filtered through a membrane filter having openings having a diameter of 3 μm, then filtered through a membrane filter having openings having a diameter of 1 μm, and further filtered through a membrane filter having openings having a diameter of 0.45 μm, to obtain a recording liquid.

The above concentrated inkjet recording liquid 13.7 parts
Nonionic surfactant (Emulgen 420, supplied by Kao Corp.) 0.2 part
Acrylic resin emulsion 2.2 parts
("W-251", solid content 40%, supplied by Nippon Polymer Industry Co., Ltd.)
Diethylene glycol 9.0 parts
Biocide (Sodium Omadine, supplied by Olin Chemical Corp.) 0.15 part
Ethylenediamine tetracetic acid sodium salt 0.03 part
Purified water 63.50 parts Example 5

A 1-gallon kneader made of stainless steel (supplied by Inoue Mfg. Co.) was charged with 250 parts of a quinacridone red pigment (Hostarperm Pink E, supplied by Hoechst Industry Ltd.), 2,500 parts of sodium chloride and 160 parts of polyethylene glycol (Polyethylene Glycol 300, supplied by Tokyo Kasei Kogyo Co., Ltd.), and these components were kneaded for 3 hours. The resultant mixture was poured into 2.5 t of warm water and stirred with a high-speed mixer under heat at about 80° C. for about 1 hour to form a slurry. The slurry was repeatedly filtered and washed with water 5 times to remove the sodium chloride and the polyethylene glycol, and a water-based red pigment slurry V having a solid content of 50% was obtained.

The following materials were placed in a sand mill and dispersed for 4 hours to prepare a concentrated inkjet recording liquid.

Water-based red pigment slurry V(solid content 50%) 30.0 parts
Acrylic resin aqueous solution 3.0 parts
("Joncryl 62", solid content 31.0%, supplied by Johnson Polymer Corp.)
Nonionic surfactant (Emulgen A-90, supplied by Kao Corp.) 1.0 part
Purified water 50.0 parts
Glycerin 6.0 parts The following materials were mixed. Then, the mixture was filtered through a membrane filter having openings having a diameter of 0.45 μm, to obtain a recording liquid.

The above concentrated inkjet recording liquid 13.5 parts
Nonionic surfactant (Emulgen A-90, supplied by Kao Corp.) 0.2 part
Acrylic resin emulsion 2.4 parts
("W-251", solid content 40%, supplied by Nippon Polymer Industry Co., Ltd.)
Ethylene glycol 10.0 parts
Biocide ("Proxel GXL", supplied by Zeneca K.K.) 0.15 part
Ethylenediamine tetracetic acid sodium salt 0.02 part
Purified water 63.53 parts Comparative Example 1

The following materials were placed in a paint shaker and dispersed for 9 hours to obtain a concentrated inkjet recording liquid.

Quinacridone red pigment 15.0 parts
(Hostarperm Pink E, supplied by Hoechst Industry Ltd.)
Acrylic resin aqueous solution 3.0 parts
("Joncryl 62", solid content 31.0%, supplied by Johnson Polymer Corp.)
Nonionic surfactant (Emulgen A-90, supplied by Kao Corp.) 1.0 part
Purified water 50.0 parts
Glycerin 6.0 parts The following materials were mixed. Then, the mixture was filtered through a membrane filter having openings having a diameter of 1 μm, to obtain a recording liquid. The amount of liquid that was filterable through the membrane filter having openings having a diameter of 1 μm was less than ⅓ of the corresponding data obtained in Example 1. Further, it was very difficult to filter the above mixture through a membrane filter having openings having a diameter of 0.45 m.

The above concentrated inkjet recording liquid 13.5 parts
Nonionic surfactant (Emulgen A-90, supplied by Kao Corp.) 0.2 part
Acrylic resin aqueous solution 2.3 parts
("Joncryl 62", solid content 31.0%, supplied by Johnson Polymer Corp.)
Ethylene glycol 10.0 parts
Biocide ("Proxel GXL", supplied by Zeneca K.K.) 0.15 part
Ethylenediamine tetracetic acid sodium salt 0.02 part
Purified water 63.53 parts Example 6

A water-based yellow pigment slurry VI having a solid content of 50% was obtained in the same manner as in Example 3 except that the 260 parts of the benzimidazolone yellow pigment was replaced with 280 parts of an azo yellow pigment ("Hansa Brilliant Yellow 9GX" supplied by Hoechst Industry Ltd.). Then, the following materials were placed in a sand mill, and dispersed for 1 hour to prepare a concentrated inkjet recording liquid.

Water-based yellow pigment slurry VI (solid content 50%) 55.0 parts
Acrylic resin aqueous solution 7.0 parts
("Joncryl 61J", solid content 31.0%, supplied by Johnson Polymer Corp.)
Nonionic surfactant (Emulgen A-90, supplied by Kao Corp.) 4.0 parts
Purified water 56.0 parts
Diethylene glycol monobutyl ether 3.0 parts
N-methyl-2-pyrrolidone 3.0 parts
2,4,7,9-tetramethyl-5-decyne-4,7-diol 1.0 part
Ethylene glycol 1.0 part The following materials were mixed. Then, the mixture was filtered through a membrane filter having openings having a diameter of 1 μm, and further filtered through a membrane filter having openings having a diameter of 0.45 μm, to obtain a recording liquid.

The above concentrated inkjet recording liquid 13.0 parts
Dispersing agent ("Solsperse 27000" supplied by Zeneca K.K.) 0.2 part
Acrylic resin emulsion 3.0 parts
("Emapoly TYN-40", solid content 44.8%, supplied by Gifu Shellac Mfg. Co., Ltd.)
Diethylaminoethanol 0.2 part
Diethylene glycol 22.5 parts
Biocide ("Proxel GXL", supplied by Zeneca K.K.) 0.15 part
Ethylenediamine tetracetic acid sodium salt 0.02 part
Purified water 63.53 parts 2,4,7,9-tetramethyl-5-decyne-4,7-diol 1.0 part

Example 7

A water-based blue pigment slurry VII having a solid content of 50% was obtained in the same manner as in Example 4 except that the 250 parts of the crude phthalocyanine pigment was replaced with 280 parts of a phthalocyanine blue pigment ("Lionol Blue KLH-T", supplied by Toyo Ink Manufacturing Co., Ltd.). Then, the following materials were placed in a sand mill, and dispersed for 3 hours to prepare a concentrated inkjet recording liquid.

Water-based blue pigment slurry VII (solid content 50%) 18.0 parts
Acrylic resin aqueous solution 3.8 parts
("Joncryl 62", solid content 31.0%, supplied by Johnson Polymer Corp.)
Nonionic surfactant (Emulgen A-90, supplied by Kao Corp.) 3.0 parts
Purified water 74.5 parts
Ethylene glycol 6.0 parts The following materials were mixed. Then, the mixture was filtered through a membrane filter having openings having a diameter of 1 μm, and further filtered through a membrane filter having openings having a diameter of 0.45 μm, to obtain a recording liquid.

The above concentrated inkjet recording liquid 13.9 parts
Dispersing agent ("Solsperse 27000" supplied by Zeneca K.K.) 0.3 part
Acrylic resin emulsion 2.1 parts
("W-251", solid content 40%, supplied by Nippon Polymer Industry Co., Ltd.)
Glycerin 24.0 parts
Biocide (Sodium Omadine, supplied by Olin Chemical Corp.) 0.15 part
Purified water 63.50 parts

Comparative Example 2

The following materials were placed in a sand mill and dispersed for 2 hours to obtain a concentrated inkjet recording liquid.

Phthalocyanine blue pigment 8.0 parts
("Lionol Blue KLH-T", supplied by Toyo Ink Manufacturing Co., Ltd.)
Acrylic resin aqueous solution 3.8 parts
("Joncryl 62", solid content 31.0%, supplied by Johnson Polymer Corp.)
Dispersing agent ("Solsperse 27000" supplied by Zeneca K.K.) 4.0 parts
Purified water 82.5 parts
Ethylene glycol 6.0 parts The following materials were mixed. Then, the mixture was filtered through a membrane filter having openings having a diameter of 1 μm, while the time required for the filtering was more than 3 times that in Example. Further, it was very difficult to filter the above mixture through a membrane filter having openings having a diameter of 0.45 μm.

The above concentrated inkjet recording liquid 13.9 part
Dispersing agent ("Solsperse 27000" supplied by Zeneca K.K.) 0.3 parts
Acrylic resin emulsion 2.1 parts
("W-251", solid content 40%, supplied by Nippon Polymer Industry Co., Ltd.)
Glycerin 24.0 parts
Biocide (Sodium Omadine, supplied by Olin Chemical Corp.) 0.15 part

Example 8

A pearl mill was charged with the following materials and dispersed for 3 hours, to prepare a concentrated inkjet recording liquid.

Figure 3:
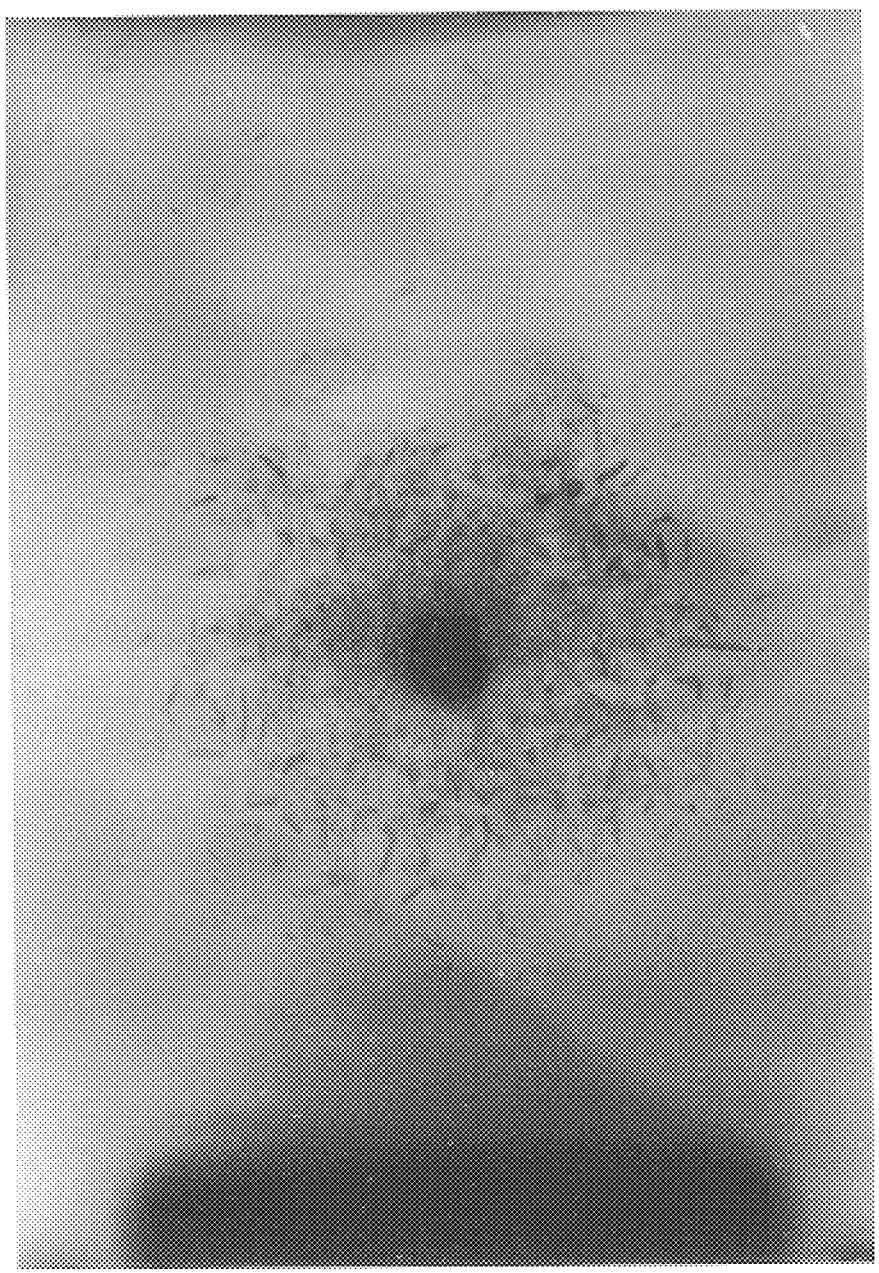
FIG. 3 shows an electron microscopic photograph of a recording liquid obtained in Example 8.

Azo yellow pigment 25.0 parts
("Lionol Yellow 22-2845", supplied by Toyo Ink Manufacturing Co., Ltd.)
Dispersing agent ("Solsperse 27000" supplied by Zeneca K.K.) 0.3 part
Acrylic resin aqueous solution 3.0 parts
("Joncryl 62", solid content 31.0%, supplied by Johnson Polymer Corp.)
Dimethylaminoethanol 0.1 part
Nonionic surfactant (Emulgen A-90, supplied by Kao Corp.) 1.3 parts
Purified water 75.0 parts
Ethylene glycol 6.0 parts The following materials were mixed. Then, the mixture was filtered through a membrane filter having openings having a diameter of 1 μm, and further filtered through a membrane filter having openings having a diameter of 0.45 μm, to obtain a recording liquid. The obtained recording liquid was observed through a transmission electron microscope to show a dispersion state as shown in FIG. 3.

The above concentrated inkjet recording liquid 13.5 parts
Nonionic surfactant (Emulgen A-90, supplied by Kao Corp.) 0.2 part
Acrylic resin emulsion 2.5 parts
("W-251", solid content 40%, supplied by Nippon Polymer Industry Co., Ltd.)
Ethylene glycol 10.0 parts
Biocide (Sodium Omadine, supplied by Olin Chemical Corp.) 0.15 part
Ethylenediamine tetracetic acid sodium salt 0.02 part
Purified water 63.53 parts

Example 9

A 1-gallon kneader made of stainless steel (supplied by Inoue Mfg. Co.) was charged with 250 parts of crude copper phthalocyanine (copper phthalocyanine supplied by Toyo Ink Manufacturing Co., Ltd.), 2,500 parts of sodium chloride and 160 parts of polyethylene glycol (Polyethylene Glycol 300, supplied by Tokyo Kasei Kogyo Co., Ltd.), and these components were kneaded for 3 hours. The resultant mixture was poured into 2.5 l of warm water and stirred with a high-speed mixer under heat at about 80° C. for about 1 hour to form a slurry. The slurry was repeatedly filtered and washed with water 5 times to remove the sodium chloride and the polyethylene glycol, and a water-based blue pigment slurry IX having a solid content of 50% was obtained.

The following materials were placed in a pearl mill and dispersed for 3 hours to prepare a concentrated inkjet recording liquid.

Water-based blue pigment slurry IX (solid content 50%) 30.0 parts

Blue pigment dispersing agent 1.4 parts
(P—[$CH_2NH(CH_2)_4N(CH_3)_2$]$_3$, P=copper phthalocyanine residue)

Dispersing agent ("Solsperse 27000" supplied by Zeneca K.K.) 0.3 part

Acrylic resin aqueous solution 3.0 parts
("Joncryl 61J", solid content 31.0%, supplied by Johnson Polymer Corp.)

Nonionic surfactant (Emulgen 420, supplied by Kao Corp.) 1.0 part

Purified water 50.0 parts

Glycerin 6.0 parts

The following materials were mixed. Then, the mixture was filtered through a membrane filter having openings having a diameter of 1 μm, and further filtered through a membrane filter having openings having a diameter of 0.45 μm, to obtain a recording liquid.

The above concentrated inkjet recording liquid 13.5 parts

Nonionic surfactant (Emulgen 420, supplied by Kao Corp.) 0.2 part

Acrylic resin emulsion 2.4 parts
("W-251", solid content 40%, supplied by Nippon Polymer Industry Co., Ltd.)

Ethylene glycol 10.0 parts

Biocide (Sodium Omadine, supplied by Olin Chemical Corp.) 0.13 part

Ethylenediamine tetracetic acid sodium salt 0.04 part

Purified water 63.33 parts

The recording liquids obtained in Examples 1 to 9 and Comparative Examples 1 and 2 were measured or evaluated for filterability, viscosity, average particle diameter, printing state, water resistance, transparency and ejection properties. Table 1 shows the results. The measurements or evaluations were carried out as described below. Further, when the recording liquids obtained in Examples 1 to 9 were stored at −40° C. for 1 week and the self-dissolved, they retained initial viscosity values and exhibited stable ejection properties. Further, when the recording liquids obtained in Examples 1 to 9 were stored in a constant-temperature chamber at 60° C. for 1 month, they retained their initial viscosity values and exhibited stable ejection properties.

[Filterability]

A recording liquid was measured for an amount of the recording liquid which was filtered through a membrane filter having a diameter of 90 mm and having openings having a diameter 0.45 μm for 1 minute.

[Viscosity]

A recording liquid was measured for a viscosity at 25° C. with a viscometer ("Viscomate VM-1A" supplied by Yamaichi Electronic Co., Ltd.).

[Average particle diameter]

A recording liquid was measured for a particle size distribution with a particle size distribution meter according to a laser diffraction method ("DSL-700", supplied by Otsuka Electronics Co., Ltd.) to determine an average particle diameter.

[Printed state]

A recording liquid was charged into a cartridge of an inkjet printer ("HG5130" supplied by Seiko-Epson), a recording was conducted on plain paper sheets ("K" supplied by Xerox, and a recorded product was visually evaluated for a printed state.

Good: Neither dot omission nor directional disorder was found.

Poor: Dot omission or directional disorder was found.

[Water resistance]

A recorded product prepared by conducting a printing on a plain paper sheet was dried and immersed in water for 1 minute, and then it was visually evaluated for ink bleeding and running.

Good: Neither ink bleeding nor running was found.

Poor: Ink bleeding or running was found.

[Transparency]

A recording liquid was spread over an inkjet OHP sheet with a 1.5 mil applicator, and visually evaluated for a transparency.

Good: Transparent

Poor: Non-transparent

[Ejection properties]

A nozzle ejection state in continuous printing was evaluated on the basis of a recorded product.

Good: A continuous printing was accurately made on predetermined positions.

Poor: An omission was caused during the continuous printing, or a printing was not made on predetermined positions.

TABLE 1

| | Filterability | Viscosity (cps) | Average particle diameter (nm) | Printed state | Water resistance |
|---|---|---|---|---|---|
| Ex. 1 | 1.0 l or more | 1.7 | 78 | Good | Good |
| Ex. 2 | 1.0 l or more | 1.8 | 110 | Good | Good |
| Ex. 3 | 1.0 l or more | 2.0 | 130 | Good | Good |
| Ex. 4 | 1.0 l or more | 1.7 | 122 | Good | Good |
| Ex. 5 | 1.0 l or more | 1.7 | 75 | Good | Good |
| Ex. 6 | 1.0 l or more | 2.6 | 115 | Good | Good |
| Ex. 7 | 1.0 l or more | 2.6 | 106 | Good | Good |
| Ex. 8 | 1.0 l or more | 1.9 | 136 | Good | Good |
| Ex. 9 | 1.0 l or more | 1.8 | 106 | Good | Good |
| CEx. 1 | 0.1 l | 1.8 | 210 | Poor | Good |
| CEx. 2 | 0.2 l | 3.2 | 178 | Poor | Good |

| | Transparency | Ejection properties | Average particle diameter of resin (nm) | Average particle diameter of pigment (nm) |
|---|---|---|---|---|
| Ex. 1 | Good | Good | 120 | 20 |
| Ex. 2 | Good | Good | 120 | 25 |
| Ex. 3 | Good | Good | 120 | 45 |
| Ex. 4 | Good | Good | 108 | 25 |
| Ex. 5 | Good | Good | 120 | 20 |
| Ex. 6 | Good | Good | 98 | 40 |
| Ex. 7 | Good | Good | 120 | 35 |
| Ex. 8 | Good | Good | 120 | 60 |
| Ex. 9 | Good | Good | 120 | 30 |
| CEx. 1 | Poor | Poor | — | 110 |
| CEx. 2 | Poor | Poor | 120 | 93 |

Ex. = Example, CEx. = Comparative Example

Example 10

A 1-gallon kneader made of stainless steel (supplied by Inoue Mfg. Co.) was charged with 20 parts of a quinacridone red pigment (Hostaperm Pink E, supplied by Hoechst Industry Ltd.), 2,000 parts of sodium chloride and 160 parts of diethylene glycol (supplied by Tokyo Kasei Kogyo Co., Ltd.), and these components were kneaded for 6 hours. The resultant mixture was poured into 6.5 l of warm water and stirred with a high-speed mixer under heat at about 80° C. for about 1 hour to form a slurry. The slurry was repeatedly filtered and washed with water 8 times to remove the sodium chloride and the diethylene glycol, and a water-based red pigment slurry X having a solid content of 50% was obtained.

The following materials were placed in a sand mill and dispersed for 0.5 hour, and then the dispersion was further dispersed under a liquid pressure of 200 kg/cm$^2$ with "Microfluidizer" supplied by Seiko EG & G for 3 hours to prepare a concentrated inkjet recording liquid.

Water-based red pigment slurry(solid content 50%) 30.0 parts

Acrylic resin aqueous solution 3.0 parts ("Joncryl 62", solid content 31.0%, supplied by Johnson Polymer Corp.)

Dimethylaminoethanol 0.1 part

Dispersing agent ("Solsperse 27000" supplied by Zeneca K.K.) 2.5 parts

Sodium dodecylbenzenesulfonate 1.2 parts

Purified water 30.0 parts

Glycerin 12.0 parts

Figure 4:
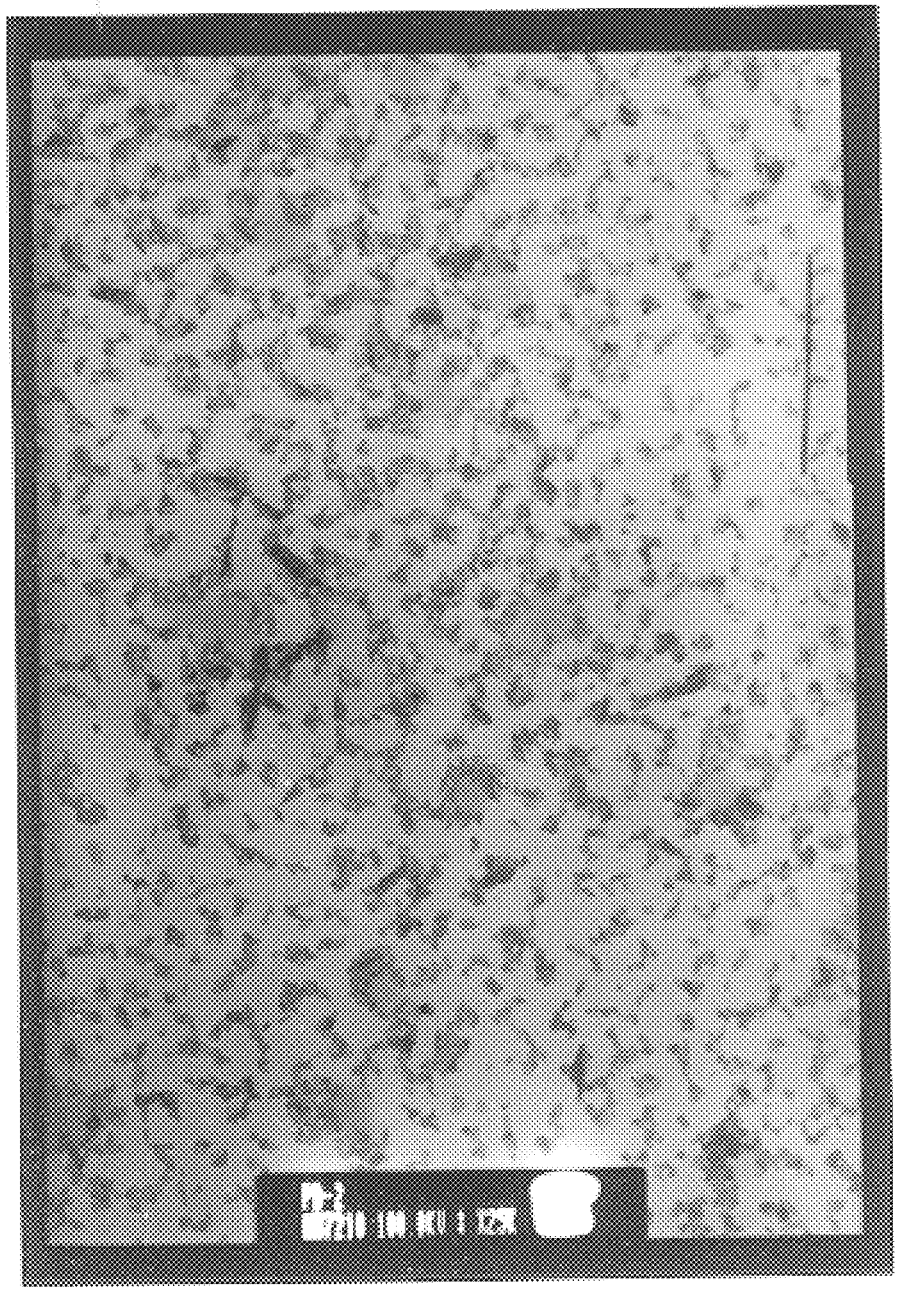
FIG. 4 shows an electron microscopic photograph of a recording liquid obtained in Example 10.
Figure 5:
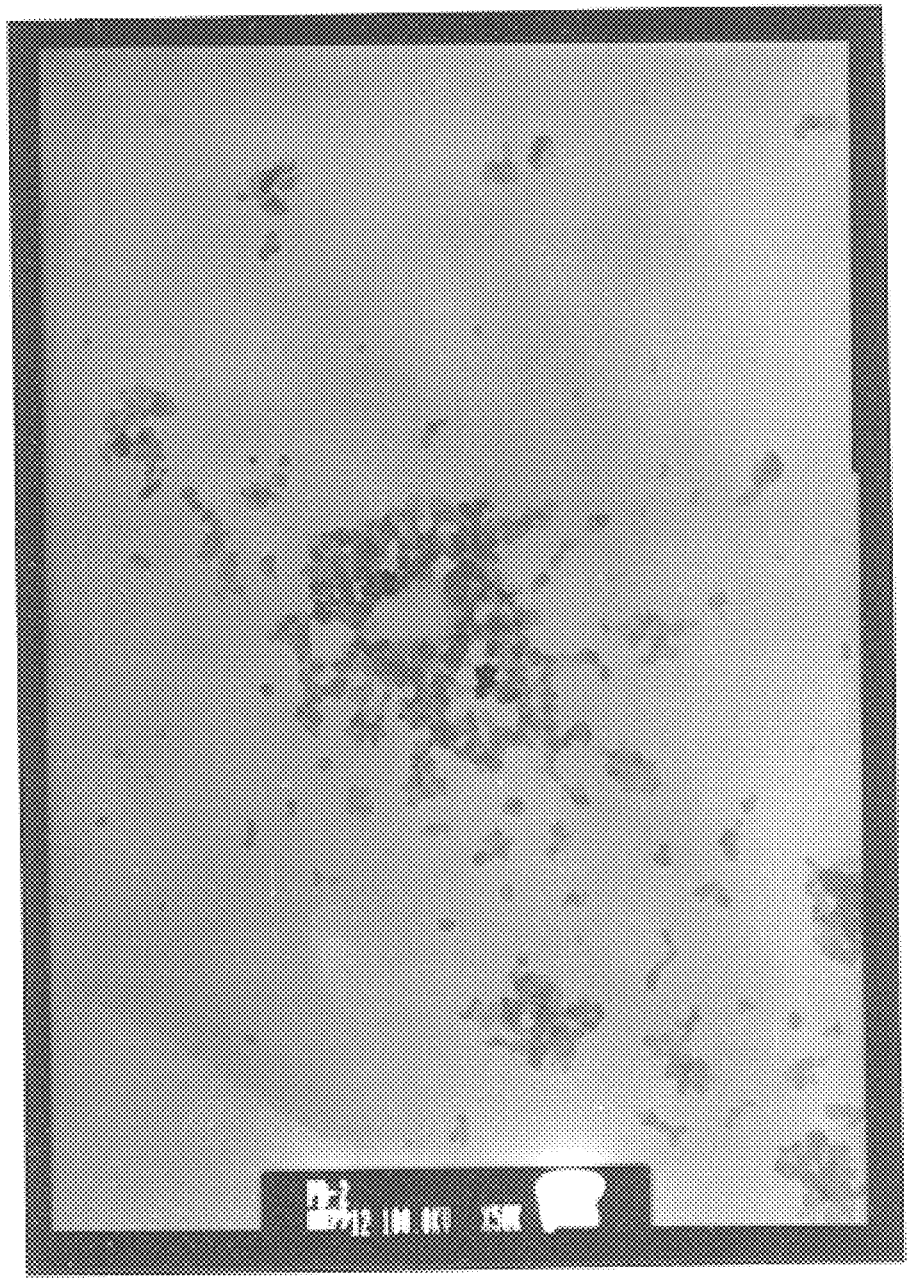
FIG. 5 shows an electron microscopic photograph of a recording liquid obtained in Example 10.

The following materials were mixed. Then, the mixture was filtered through a membrane filter having openings having a diameter of 1 μm and further filtered through a membrane filter having openings having a diameter of 0.45 μm, to obtain a recording liquid. The obtained recording liquid was observed through a transmission electron microscope to show a dispersion state as shown in FIGS. 4 and 5.

The above concentrated inkjet recording liquid 15.5 parts

Nonionic surfactant (Emulgen A-90, supplied by Kao Corp.) 0.4 part

Acrylic resin emulsion 1.5 parts ("W-251", solid content 40%, supplied by Nippon Polymer Industry Co., Ltd.)

Ethylene glycol 10.0 parts

Biocide (Sodium Omadine, supplied by Olin Chemical Corp.) 0.15 part

Ethylenediamine tetracetic acid sodium salt 0.02 part

Purified water 63.53 parts

Example 11

A 1-gallon kneader made of stainless steel (supplied by Inoue Mfg. Co.) was charged with 180 parts of crude copper phthalocyanine (copper phthalocyanine supplied by Toyo Ink Manufacturing Co., Ltd.), 2,000 parts of sodium chloride, 20 parts of a blue pigment dispersing agent (P—[CH$_2$NH(CH$_2$)$_4$N(CH$_3$)$_2$]$_3$, P=copper phthalocyanine residue) and 200 parts of polyethylene glycol ("Polyethylene Glycol 300", supplied by Tokyo Kasei Kogyo Co., Ltd.), and these components were kneaded for 3 hours. The resultant mixture was poured into 6.5 l of warm water and stirred with a high-speed mixer under heat at about 80° C. for about 1 hour to form a slurry. The slurry was repeatedly filtered and washed with water 8 times to remove the sodium chloride and the polyethylene glycol, and a water-based blue pigment slurry XI having a solid content of 50% was obtained.

The following materials were placed in a paint shaker and dispersed for 1 hour, and then the dispersion was further dispersed under a liquid pressure of 600 kg/cm$^2$ with "Microfluidizer" supplied by Seiko EG & G for 1.5 hours to prepare a concentrated inkjet recording liquid.

Water-based blue pigment slurry XI (solid content 50%) 50.0 parts

Acrylic resin aqueous solution 3.5 parts ("Joncryl 61J", solid content 31.0%, supplied by Johnson Polymer Corp.)

Nonionic surfactant (Emulgen 420, supplied by Kao Corp.) 1.5 parts

Purified water 25.0 parts

Glycerin 20.0 parts

The following materials were mixed. Then, the mixture was filtered through a membrane filter having openings having a diameter of 1 μm, and further filtered through a membrane filter having openings having a diameter of 0.45 μm, to obtain a recording liquid.

The above concentrated inkjet recording liquid 15.0 parts

Nonionic surfactant (Emulgen 420, supplied by Kao Corp.) 0.2 part

Acrylic resin emulsion 2.2 parts ("W-251", solid content 40%, supplied by Nippon Polymer Industry Co., Ltd.)

Ethylene glycol 10.0 parts

Biocide (Sodium Omadine, supplied by Olin Chemical Corp.) 0.15 part

Ethylenediamine tetracetic acid sodium salt 0.02 part

Purified water 62.53 parts

Example 12

An inkjet recording liquid was obtained in the same manner as in Example 11 except that 180 parts of the crude copper phthalocyanine was replaced with 260 parts of a benzimidazolone yellow pigment (Hostarperm Yellow H3G, supplied by Hoechst Industry Ltd.) and that 20 parts of the blue pigment dispersing agent was replaced with 15 parts of a yellow pigment dispersing agent (P—[CH$_2$NH(CH$_2$)$_4$N (CH$_3$)$_2$]$_3$, P=benzimidazole residue).

Example 13

The same kneader as that used in Example 10 was charged with 250 parts of crude copper phthalocyanine (copper phthalocyanine supplied by Toyo Ink Manufacturing Co., Ltd.), 900 parts of sodium chloride, 25 parts of a blue pigment dispersing agent (P—[CH$_2$NH(CH$_2$)$_4$N(CH$_3$)$_2$]$_3$, P=copper phthalocyanine residue), 100 parts of an acrylic oligomer ("Joncryl 682" supplied by Johnson Polymer Corp.) and 160 parts of diethylene glycol (supplied by Tokyo Kasei Kogyo Co., Ltd.), and these components were kneaded for 2 hours, in the same manner as in Example 10. Then, the resultant mixture was treated in the same manner as in Example 10 to give a water-based blue pigment slurry XIII having a solid content of 50%.

The following materials were placed in a sand mill and dispersed for 1 hour, and then the dispersion was further dispersed under a liquid pressure of 400 kg/cm$^2$ with "Microfluidizer" supplied by Seiko EG & G for 2 hours to prepare a concentrated inkjet recording liquid.

Water-based blue pigment slurry XIII (solid content 50%) 30.0 parts

Acrylic resin emulsion 2.3 parts ("F-157", solid content 40%, supplied by Nippon Polymer Industry Co., Ltd.)

Dispersing agent ("Solsperse 27000" supplied by Zeneca K.K.) 0.5 part

Purified water 74.0 parts

Glycerin 5.8 parts

Dimethylethanolamine 0.1 part

The following materials were mixed. Then, the mixture was filtered through a membrane filter having openings having a diameter of 3 μm, then filtered through a membrane filter having openings having a diameter of 1 μm, and further filtered through a membrane filter having openings having a diameter of 0.45 μm, to obtain a recording liquid.

The above concentrated inkjet recording liquid 13.7 parts

Nonionic surfactant (Emulgen 420, supplied by Kao Corp.) 0.2 part

Acrylic resin emulsion 2.2 parts ("W-251", solid content 40%, supplied by Nippon Polymer Industry Co., Ltd.)

Diethylene glycol 9.0 parts

Biocide (Sodium Omadine, supplied by Olin Chemical Corp.) 0.15 part

Ethylenediamine tetracetic acid sodium salt 0.03 part

Purified water 63.50 parts

Example 14

A 1-gallon kneader made of stainless steel (supplied by Inoue Mfg. Co.) was charged with 250 parts of a quinacridone red pigment (Hostarperm Pink E, supplied by Hoechst Industry Ltd.), 2,500 parts of sodium chloride and 160 parts of polyethylene glycol (Polyethylene Glycol 300, supplied by Tokyo Kasei Kogyo Co., Ltd.), and these components were kneaded for 3 hours. The resultant mixture was poured into 8.5 l of warm water and stirred with a high-speed mixer under heat at about 80° C. for about 1 hour to form a slurry. Then, the slurry was repeatedly filtered and washed with water 5 times to remove the sodium chloride and the polyethylene glycol, and a water-based red pigment slurry XIV having a solid content of 50% was obtained.

The following materials were placed in a sand mill and dispersed for 1 hour, and then the dispersion was further dispersed under a liquid pressure of 300 kg/cm$^2$ with "Microfluidizer" supplied by Seiko EG & G for 2 hours to prepare a concentrated inkjet recording liquid.

Water-based red pigment slurry XIV (solid content 50%) 30.0 parts

Acrylic resin aqueous solution 3.0 parts ("Joncryl 62", solid content 31.0%, supplied by Johnson Polymer Corp.)

Nonionic surfactant (Emulgen A-90, supplied by Kao Corp.) 1.0 part

Purified water 50.0 parts

Glycerin 6.0 parts

The following materials were mixed. Then, the mixture was filtered through a membrane filter having openings having a diameter of 0.45 μm, to obtain a recording liquid.

The above concentrated inkjet recording liquid 13.5 parts

Nonionic surfactant (Emulgen A-90, supplied by Kao Corp.) 0.2 part

Acrylic resin emulsion 2.4 parts ("W-251", solid content 40%, supplied by Nippon Polymer Industry Co., Ltd.)

Ethylene glycol 10.0 parts

Biocide ("Proxel GXL", supplied by Zeneca K.K.) 0.15 part

Ethylenediamine tetracetic acid sodium salt 0.02 part

Purified water 63.53 parts

Example 15

A water-based yellow pigment slurry XV having a solid content of 50% was obtained in the same manner as in Example 12 except that the 260 parts of the benzimidazolone yellow pigment was replaced with 280 parts of an azo yellow pigment ("Hansa Brilliant Yellow 9GX" supplied by Hoechst Industry Ltd.). Then, the following materials were placed in a sand mill and dispersed for 1 hour, and then the dispersion was further dispersed under a liquid pressure of 300 kg/cm$^2$ with "Microfluidizer" supplied by Seiko EG & G for 2 hours to prepare a concentrated inkjet recording liquid.

Water-based yellow pigment slurry XV (solid content 50%) 55.0 parts

Acrylic resin aqueous solution 7.0 parts ("Joncryl 61J", solid content 31.0%, supplied by Johnson Polymer Corp.)

Nonionic surfactant (Emulgen A-90, supplied by Kao Corp.) 4.0 parts

Purified water 56.0 parts

Diethylene glycol monobutyl ether 3.0 parts

N-methyl-2-pyrrolidone 3.0 parts 2,4,7,9-tetramethyl-5-decyne-4,7-diol 1.0 part

Ethylene glycol 1.0 part

The following materials were mixed. Then, the mixture was filtered through a membrane filter having openings having a diameter of 1 μm, and further filtered through a membrane filter having openings having a diameter of 0.45 μm, to obtain a recording liquid.

The above concentrated inkjet recording liquid 13.0 parts

Dispersing agent ("Solsperse 27000" supplied by Zeneca K.K.) 0.2 part

Acrylic resin emulsion 3.0 parts ("Emapoly TYN-40", solid content 44.8%, supplied by Gifu Shellac Mfg. Co., Ltd.)

Diethylaminoethanol 0.2 part

Diethylene glycol 22.5 parts

Biocide ("Proxel GXL", supplied by Zeneca K.K.) 0.15 part

Ethylenediamine tetracetic acid sodium salt 0.02 part

Purified water 63.53 parts 2,4,7,9-tetramethyl-5-decyne-4,7-diol 1.0 part

Example 16

A water-based blue pigment slurry XVI having a solid content of 50% was obtained in the same manner as in Example 13 except that the 250 parts of the crude phthalocyanine pigment was replaced with 280 parts of a phthalocyanine blue pigment ("Lionol Blue KLH-T", supplied by Toyo Ink Manufacturing Co., Ltd.). Then, the following materials were placed in a sand mill and dispersed for 1 hour, and then the dispersion was further dispersed under a liquid pressure of 800 kg/cm$^2$ with "Microfluidizer" supplied by Seiko EG & G for 1 hour to prepare a concentrated inkjet recording liquid.

Water-based blue pigment slurry XVI (solid content 50%) 18.0 parts

Acrylic resin aqueous solution 3.8 parts ("Joncryl 62", solid content 31.0%, supplied by Johnson Polymer Corp.)

Nonionic surfactant (Emulgen A-90, supplied by Kao Corp.) 3.0 parts

Purified water 74.5 parts

Ethylene glycol 6.0 parts

The following materials were mixed. Then, the mixture was filtered through a membrane filter having openings having a diameter of 1 μm, and further filtered through a membrane filter having openings having a diameter of 0.45 μm, to obtain a recording liquid.

The above concentrated inkjet recording liquid 13.9 parts

Dispersing agent ("Solsperse 27000" supplied by Zeneca K.K.) 0.3 part

Acrylic resin emulsion 2.1 parts ("W-251", solid content 40%, supplied by Nippon Polymer Industry Co., Ltd.)

Glycerin 24.0 parts

Biocide (Sodium Omadine, supplied by Olin Chemical Corp.) 0.15 part

Purified water 63.50 parts

Example 17

A pearl mill was charged with the following materials and dispersed for 1 hour, and then the dispersion was further dispersed under a liquid pressure of 800 kg/cm$^2$ with "Microfluidizer" supplied by Seiko EG & G for 2 hours to prepare a concentrated inkjet recording liquid.

Azo yellow pigment 25.0 parts ("Lionol Yellow 22-2845", supplied by Toyo Ink Manufacturing Co., Ltd.)

Dispersing agent ("Solsperse 27000" supplied by Zeneca K.K.) 0.3 part

Acrylic resin aqueous solution 3.0 parts ("Joncryl 62", solid content 31.0%, supplied by Johnson Polymer Corp.)

Dimethylaminoethanol 0.1 part

Nonionic surfactant (Emulgen A-90, supplied by Kao Corp.) 1.3 parts

Purified water 75.0 parts

Ethylene glycol 6.0 parts

The following materials were mixed. Then, the mixture was filtered through a membrane filter having openings having a diameter of 1 μm, and further filtered through a membrane filter having openings having a diameter of 0.45 μm, to obtain a recording liquid.

The above concentrated inkjet recording liquid 13.5 parts

Nonionic surfactant (Emulgen A-90, supplied by Kao Corp.) 0.2 part

Acrylic resin emulsion 2.5 parts ("W-251", solid content 40%, supplied by Nippon Polymer Industry Co., Ltd.)

Ethylene glycol 10.0 parts

Biocide (Sodium Omadine, supplied by Olin Chemical Corp.) 0.15 part

Ethylenediamine tetracetic acid sodium salt 0.02 part

Purified water 63.53 parts

Example 18

A 1-gallon kneader made of stainless steel (supplied by Inoue Mfg. Co.) was charged with 250 parts of crude copper phthalocyanine (copper phthalocyanine supplied by Toyo Ink Manufacturing Co., Ltd.), 2,500 parts of sodium chloride and 160 parts of polyethylene glycol (Polyethylene Glycol 300, supplied by Tokyo Kasei Kogyo Co., Ltd.), and these components were kneaded for 3 hours. The resultant mixture was poured into 2.5 l of warm water and stirred with a high-speed mixer under heat at about 80° C. for about 1 hour to form a slurry. The slurry was repeatedly filtered and washed with water 5 times to remove the sodium chloride and the polyethylene glycol, and a water-based red pigment slurry XVIII having a solid content of 50% was obtained.

The following materials were placed in a pearl mill and dispersed for 1 hour, and then the dispersion was further dispersed under a liquid pressure of 500 kg/cm$^2$ with "Microfluidizer" supplied by Seiko EG & G for 30 minutes to prepare a concentrated inkjet recording liquid.

Water-based blue pigment XVIII (solid content 50%) 30.0 parts

Blue pigment dispersing agent 1.4 parts (P—[CH$_2$NH(CH$_2$)$_4$N(CH$_3$)$_2$]$_3$, P=copper phthalocyanine residue)

Dispersing agent ("Soisperse 27000" supplied by Zeneca K.K.) 0.3 part

Acrylic resin aqueous solution 3.0 parts ("Joncryl 61J", solid content 31.0%, supplied by Johnson Polymer Corp.)

Nonionic surfactant (Emulgen 420, supplied by Kao Corp.) 1.0 part

Purified water 50.0 parts

Glycerin 6.0 parts

The following materials were mixed. Then, the mixture was filtered through a membrane filter having openings having a diameter of 1 μm, and further filtered through a membrane filter having openings having a diameter of 0.45 μm, to obtain a recording liquid.

The above concentrated inkjet recording liquid 13.5 parts

Nonionic surfactant (Emulgen 420, supplied by Kao Corp.) 0.2 part

Acrylic resin emulsion 2.4 parts ("W-251", solid content 40%, supplied by Nippon Polymer Industry Co., Ltd.)

Ethylene glycol 10.0 parts

Biocide (Sodium Omadine, supplied by Olin Chemical Corp.) 0.13 part

Ethylenediamine tetracetic acid sodium salt 0.04 part

Purified water 63.33 parts

The recording liquids obtained in Examples 10 to 18 were measured or evaluated for filterability, viscosity, average particle diameter, printing state, water resistance, transparency and ejection properties as described after Example 9. Table 2 shows the results. Further, when the recording liquids obtained in Examples 10 to 18 were stored at −40° C. for 1 week and the self-dissolved, they retained initial viscosity values and exhibited stable ejection properties. Further, when the recording liquids obtained in Examples 10 to 18 were stored in a constant-temperature chamber at 60° C. for 1 month, they retained their initial viscosity values and exhibited stable ejection properties.

TABLE 2

|  | Filterability | Viscosity (cps) | Average particle diameter (nm) | Printed state | Water resisatnce |
| --- | --- | --- | --- | --- | --- |
| Ex. 10 | 1.0 l or more | 2.1 | 75 | Good | Good |
| Ex. 11 | 1.0 l or more | 1.8 | 101 | Good | Good |
| Ex. 12 | 1.0 l or more | 2.0 | 105 | Good | Good |
| Ex. 13 | 1.0 l or more | 1.7 | 112 | Good | Good |

TABLE 2-continued

| | | | | | |
|---|---|---|---|---|---|
| Ex. 14 | 1.0 l or more | 1.7 | 73 | Good | Good |
| Ex. 15 | 1.0 l or more | 2.6 | 105 | Good | Good |
| Ex. 16 | 1.0 l or more | 2.6 | 102 | Good | Good |
| Ex. 17 | 1.0 l or more | 1.9 | 126 | Good | Good |
| Ex. 18 | 1.0 l or more | 1.8 | 102 | Good | Good |

| | Transparency | Ejection properties | Average particle diameter of resin (nm) | Average particle diameter of pigment (nm) |
|---|---|---|---|---|
| Ex. 10 | Good | Good | 120 | 20 |
| Ex. 11 | Good | Good | 120 | 25 |
| Ex. 12 | Good | Good | 120 | 35 |
| Ex. 13 | Good | Good | 108 | 23 |
| Ex. 14 | Good | Good | 120 | 20 |
| Ex. 15 | Good | Good | 98 | 32 |
| Ex. 16 | Good | Good | 120 | 30 |
| Ex. 17 | Good | Good | 120 | 35 |
| Ex. 18 | Good | Good | 120 | 28 |

Ex. = Example, CEx. = Comparative Example

Effect of the Invention

According to the present invention, there can be obtained a recording liquid which contains water as a medium but gives recorded products having excellent water resistance. The limitation imposed on recording sheets in use is remarkably decreased, and the application of inkjet recording can be expanded to fields where, conventionally, the water resistance is liable to be insufficient under the influence of recording sheets.

Specifically, the inkjet recording liquid of the present invention can be used in the fileds of document preparation in offices, marking and numbering on corrugated paper, barcode recordings, and the like.

What is claimed is:

1. A process for the production of an inkjet recording liquid, which comprises mixing and dispersing a water-based dispersion of an organic pigment and a water-based dispersion of resin particles having an average particle diameter of 50 to 300 nm, to form a water-based dispersion of colorant particles formed by coating each of the resin particles with the organic pigment, wherein the water-based dispersion of the organic pigment is obtained by dispersing the organic piqment in a water-based liquid to prepare a dispersion and allowing the dispersion to pass a flow path having at least two corner portions under a liquid pressure of 100 to 1,000 kg/cm².

2. A process according to claim 1, wherein the inkjet recording liquid further contains free organic pigment in addition to the colorant particles.

3. A process according to claim 1, wherein the organic pigment constituting the colorant particles has an average primary particle diameter of 10 to 70 nm.

4. A process according to claim 2, wherein the free organic pigment has an average primary particle diameter of 10 to 70 nm.

5. A process according to claim 1, wherein the colorant particles have a resin particles:organic pigment weight ratio of 1:6 to 6:1.

6. A process according to claim 2, wherein the inkjet recording liquid has a colorant particles:free organic pigment weight ratio of 1:10 to 10:1.

7. A process according to claim 1, wherein the inkjet recording liquid contains 0.1 to 10% by weight of the colorant particles as a solid content.

8. A process according to claim 2, wherein the inkjet recording liquid contains 0.1 to 11% by weight of the colorant particles and the free organic pigment as a solid content.

9. A process according to claim 1, wherein the water-based dispersion of the colorant particles further contains a free organic pigment.

10. A process according to claim 1, wherein the water-based dispersion of the organic pigment is obtained by mixing and dispersing the organic pigment and a dispersing agent with and in a water-based liquid.

11. A process according to claim 1, wherein the water-based dispersion of the organic pigment is obtained by mixing and dispersing the organic pigment with and in the water-based liquid together with a compound of the formula (1),

$$P-[X-Y-Z-N(R^1)R^2]_n \qquad (1)$$

wherein P is an organic dyestuff residue, a heterocyclic ring residue or an aromatic polycyclic compound residue, X is a divalent binding group composed of a chemically rational combination of 2 to 15 atoms selected from S, C, N, O and H, Y is a direct bond or a divalent binding group selected from —NR— (in which R is H or an alkyl group having 1 to 18 carbon atoms) or —O—, Z is an alkylene group having 1 to 6 carbon atoms, each of $R^1$ and $R^2$ is independently an alkyl group having 1 to 18 carbon atoms which alkyl group may have a substituent, provided that $R^1$ and $R^2$ may together form a heterocyclic ring which may have a substituent, and n is an integer of 1 to 3.

12. A process according to claim 1, wherein the water-based dispersion of the organic pigment is prepared by kneading the organic pigment together with a water-soluble inorganic salt and a water-soluble solvent to obtain a kneaded mixture, dispersing the kneaded mixture in water and then removing the water-soluble inorganic salt and the water-soluble solvent.

13. A process according to claim 12, wherein a compound of the formula (1) is further added for the kneading,

$$P-[X-Y-Z-N(R^1)R^2]_n \qquad (1)$$

wherein P is an organic dyestuff residue, a heterocyclic ring residue or an aromatic polycyclic compound residue, X is a divalent binding group composed of a chemically rational combination of 2 to 15 atoms selected from S, C, N, O and H, Y is a direct bond or a divalent binding group selected from —NR— (in which R is H or an alkyl group having 1 to 18 carbon atoms) or —O—, Z is an alkylene group having 1 to 6 carbon atoms, each of $R^1$ and $R^2$ is independently an alkyl group having 1 to 18 carbon atoms which alkyl group may have a substituent, provided that $R^1$ and $R^2$ may together form a heterocyclic ring which may have a substituent, and n is an integer of 1 to 3.

14. A process according to claim 1, wherein the water-based dispersion of the organic pigment is obtained by dispersing the organic pigment and a dispersing agent in the water-based liquid to prepare a dispersion and allowing the dispersion to pass the flow path recited in claim 1.

15. A process according to claim 1, wherein the water-based dispersion of the organic pigment is obtained by dispersing the organic pigment in the water-based liquid to prepare a dispersion, adding a dispersing agent to the dispersion to obtain a mixture and allowing the mixture to pass the flow path recited in claim 1.

* * * * *